US008542307B2

(12) United States Patent
Hashiguchi

(10) Patent No.: US 8,542,307 B2
(45) Date of Patent: Sep. 24, 2013

(54) MONITOR FOR VIDEO CAMERA

(75) Inventor: Kentaro Hashiguchi, Tsushima (JP)

(73) Assignee: Nihon Video System Co., Ltd., Tsushima-shi (JP)

( * ) Notice: Subject to any disclaimer, the term of this patent is extended or adjusted under 35 U.S.C. 154(b) by 0 days.

(21) Appl. No.: 13/496,174

(22) PCT Filed: Jan. 20, 2012

(86) PCT No.: PCT/JP2012/051268

§ 371 (c)(1), (2), (4) Date: Mar. 14, 2012

(65) Prior Publication Data

US 2013/0188082 A1 Jul. 25, 2013

(51) Int. Cl.
*H04N 5/222* (2006.01)

(52) U.S. Cl.
USPC ............ 348/333.01; 348/333.02; 348/333.04; 345/204; 345/10

(58) Field of Classification Search
USPC .................. 348/333.02, 333.01; 345/10, 204
See application file for complete search history.

(56) References Cited

U.S. PATENT DOCUMENTS 4,675,757 A * 6/1987 Block .......................... 360/72.2
5,568,205 A * 10/1996 Hurwitz ........................ 348/723
2004/0120689 A1* 6/2004 Yamasaki ....................... 386/46
2004/0247284 A1* 12/2004 Yamasaki ....................... 386/52
2009/0142032 A1* 6/2009 Myokan .......................... 386/65
2011/0181766 A1* 7/2011 Hashiguchi .............. 348/333.12
2011/0227966 A1* 9/2011 Mori ............................ 345/690

FOREIGN PATENT DOCUMENTS

JP 2-39231 U 3/1990
JP 10-285438 A 10/1998

OTHER PUBLICATIONS

Written Opinion of the International Searching Authority mailed Feb. 14, 2012, issued in corresponding PCT/JP2012/051268, filed Jan. 20, 2012, 3 pages.

* cited by examiner

*Primary Examiner* — Antoinette Spinks

(74) *Attorney, Agent, or Firm* — Christensen O'Connor Johnson Kindness PLLC

(57) ABSTRACT

There is provided a video camera monitor that is capable of turning on a tally lamp without troublesome wiring even when a video camera does not have a tally signal output terminal. The present invention provides a video camera monitor that includes a camera video input unit and a tally display controller. The camera video input unit receives a camera video signal including a REC RUN time code, and the tally display controller controls tally display. The tally display controller controls the tally display based on whether the REC RUN time code is being advanced.

4 Claims, 3 Drawing Sheets

MONITOR FOR VIDEO CAMERA

TECHNICAL FIELD

The present invention relates to a video camera monitor, which receives a signal from a video camera and provides display based on the signal. The video camera monitor may be a view finder mounted to the video camera when in use, or a monitor not-mounted to the video camera when in use.

BACKGROUND ART

In general, a video camera is provided with a small view finder. Recently, an image quality of a high-definition camera has been highly improved, and the high-definition camera is often connected to a user-installed video camera view finder having a large screen. The view finder needs functions for enabling the video camera operator to easily adjust focus of the video, to check the angle of view, or to check if the camera is recording. If the above functions are provided, the video camera operator is easily capable of checking the video more accurately compared with the case of the small view finder. Thus, a video camera for the broadcast use is connectable to, in general, a dedicated view finder, which has a video display and a tally display unit for showing that the camera is recording

SUMMARY OF THE INVENTION

Problems to be Solved by the Invention

An external view finder may be provided at a position away from a camera for usage. In the above case, a user who checks the camera video through the view finder may want to know whether the camera is recording or not. A camera main body has, usually, a tally lamp that is on only during recording. However, when the view finder is provided, it may be difficult to check the tally display provided to the camera main body.

The view finder may be provided with a tally input terminal, and in such a case, it is possible to turn on the tally lamp by inputting tally signals into the tally input terminal during recording. However, small video cameras may not have the terminal for outputting the tally signals, and in such a case, it may be difficult to obtain the tally signals from the video camera.

Also, even if the video camera is provided with the tally signal output terminal, it is needed to wire the view finder for the video camera in a troublesome manner.

The above circumstances are true for a video camera monitor different from the view finder.

The present invention is made in view with the above circumstances, and provides a video camera monitor capable of turning on the tally lamp without a troublesome wiring even when the video camera does not have a tally signal output terminal.

Means for Solving the Problems

According to the present invention, there is provided a video camera monitor that includes a camera video input unit and a tally display controller. The camera video input unit receives a camera video signal that includes a REC RUN time code, and the tally display controller controls tally display. The tally display controller controls the tally display based on whether the REC RUN time code is being advanced.

Recently, there is an inexpensive video camera capable of capturing a high-quality video that may be sufficiently usable for the broadcast. One of the bottlenecks of such cameras in the broadcast use is that the camera is incapable of outputting the tally signal, and thereby incapable of turning on the tally lamp of the video camera monitor. In the above situation, the inventor has studied the method for turning on the tally lamp, and as a result, the inventor has found that the video signal inputted into the video camera monitor has a REC RUN time code that is advanced only during recording. The inventor found that it is possible to control the tally display without using an additional wiring for the tally display if the REC RUN time code is used, and completed the present invention.

According to the present invention, it is possible to employ the inexpensive video camera for broadcast use, which camera was conventionally incapable of causing an external video camera monitor to provide tally display.

The video camera monitor of the present invention is not only applicable to a camera having a camera video signal output. However, the video camera monitor is also applicable to an analog video camera if a digital signal convertor is used to superimpose the time code signal in a single cable. The video camera monitor of the present invention is not only applicable to the inexpensive video camera. However, the video camera monitor may also be sufficiently applicable to an ENG video camera or a video camera monitor of the studio video camera.

EMBODIMENT CARRYING OUT THE INVENTION

A video camera monitor according to one embodiment of the present invention will be described below with reference to FIG. 1 to FIG. 3. The embodiment shown below is merely an example, and the present invention is not limited to the embodiment below.

Figure 1:
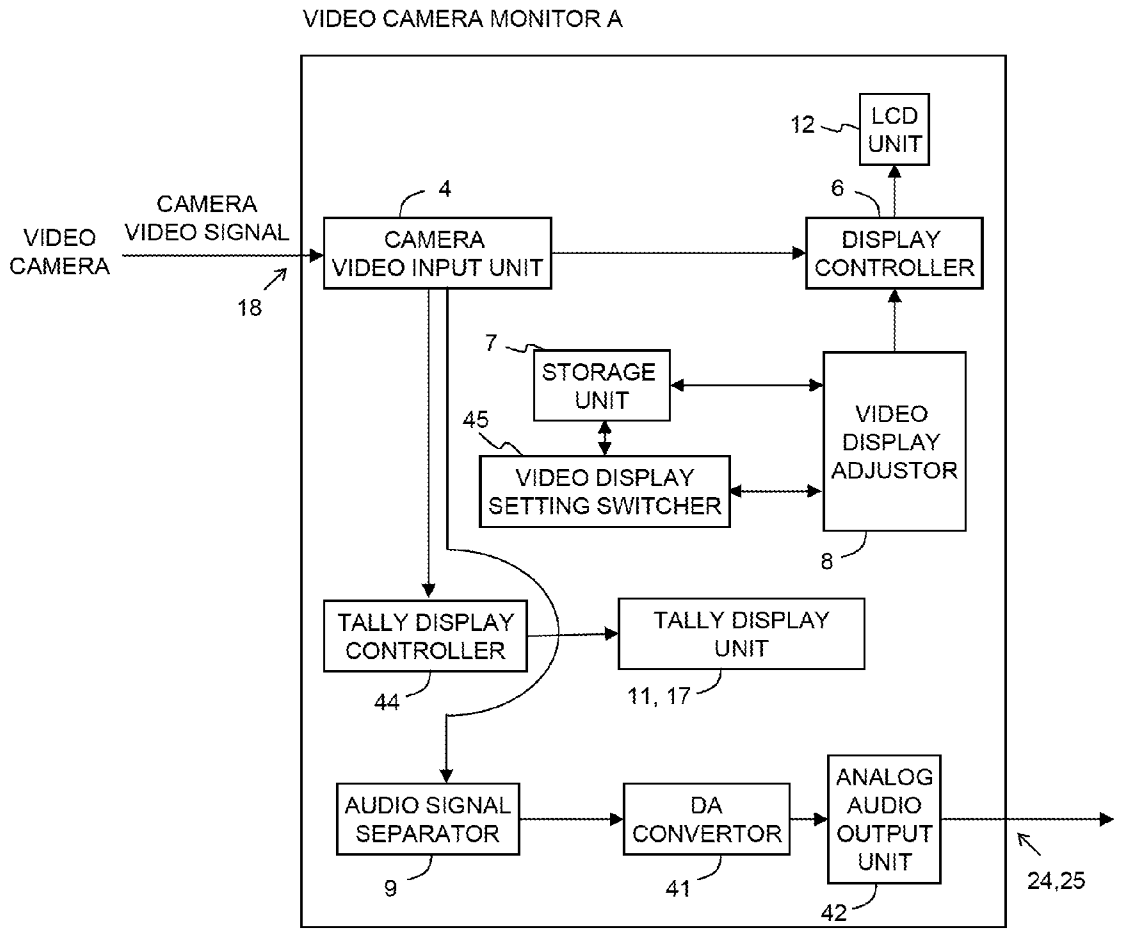
FIG. 1 is a connection diagram illustrating a configuration of a video camera monitor and a camera according to one embodiment of the present invention.

FIG. 1 is a diagram illustrating a connection configuration of a video camera monitor and a video camera according to the present embodiment. FIGS. 2 and 3 show one example of an appearance of a video camera monitor A and an arrangement of connectors and a display unit, respectively. FIGS. 2 and 3 show a front view and a backside view, respectively.

1. Internal Configuration of Video Camera Monitor A

Firstly, the internal configuration of the video camera monitor A is described with reference to FIG. 1.

The video camera monitor A includes a camera video input unit 4 and a tally display controller 44. The camera video input unit 4 receives camera video signals including a REC RUN time code, and the tally display controller 44 controls tally display. The tally display controller 44 controls the tally display based on whether REC RUN time code is being advanced. In the present embodiment, due to the above configuration, it is possible to control the tally display by using the REC RUN time code.

In the present specification, the camera video signal may be any signal provided that the camera video signal includes the REC RUN time code. The camera video signal may be an SDI signal (such as, an HD-SDI signal, an SD-SDI, 3G-SDI signal), an HDMI signal, or 3D. Also, alternatively, the camera video signal may be a digital signal outputted from the video camera, or may be a digital signal obtained by AD-converting an analog signal outputted from the video camera.

There are two types of the time code including a FREE RUN time code and a REC RUN time code. The former keeps advanced regardless of whether the camera is recording or not, and is usually used for synchronizing multiple cameras. In contrast, the REC RUN time code is advanced only during recording. Regardless of the specification of the camera video signal, the camera video signal usually includes the time code, which is one of the FREE RUN time code and the REC RUN time code according to the video camera. In order to cause the video camera monitor A of the present embodiment to provide the tally display, the camera video signal only needs to include the REC RUN time code. The video camera used together with the video camera monitor A may be the one that is capable of using only the REC RUN time code, or may be another one that is capable of selectively using one of the FREE RUN time code and the REC RUN time code.

The tally display controller 44 analyzes the REC RUN time code in the camera video signals, and when the tally display controller 44 determines that the time code is being advanced, the tally display controller 44 determines that the video camera is recording, and thereby turning on tally display units 11, 17. The above enables the control of the tally display based on whether the REC RUN time code is being advanced.

Also, the video camera monitor apparatus A further includes a video display adjustor 8, a storage unit 7, and a video display setting switcher 45. The video display adjustor 8 adjusts a peaking level, a brightness level, and a contrast level. The storage unit 7 stores an operational state adjusted by the video display adjustor 8. The video display setting switcher 45 switches the operation between the state set by the storage unit 7 and an initial state. Because of the configuration, the video camera operator is capable of storing the video display setting, which the video camera operator prefers, in the storage unit 7, and is capable of reading the stored setting at any moment. As a result, even if a user different from the video camera operator has adjusted the video display, the video camera operator is capable of restoring the setting of his/her preference.

The camera video signal (such as, the SDI video signal) may include an embedded audio signal. The video camera monitor apparatus A may preferably further includes an audio signal separator 9, a DA convertor 41, and an analog audio output unit 42. The audio signal separator 9 separates the embedded audio digital signal from the camera video signal, and the DA convertor 41 converts the digital signal, which is separated by the separator, into the analog signal. Then, the analog audio output unit 42 outputs the converted analog signal. A conventional video camera monitor does not have an audio output, and thereby requires the video camera operator on site to wire the additional cable in order to listen to return audio or on air audio. According to the configuration of the present embodiment, without wiring the additional cable, it is possible to listen to the return audio or on air audio.

Also, the video camera monitor apparatus A may include a camera video output unit that outputs the camera video signal received by he camera video input unit 4. The camera video signal outputted by the camera video output unit is inputted into an external apparatus, such as a switcher.

2. Front Appearances of Video Camera Monitor Apparatus A and Arrangement of Connectors and Display Unit Next, the front appearances of the video camera monitor apparatus A and the arrangement of the connectors and the display unit are described.

Figure 2:
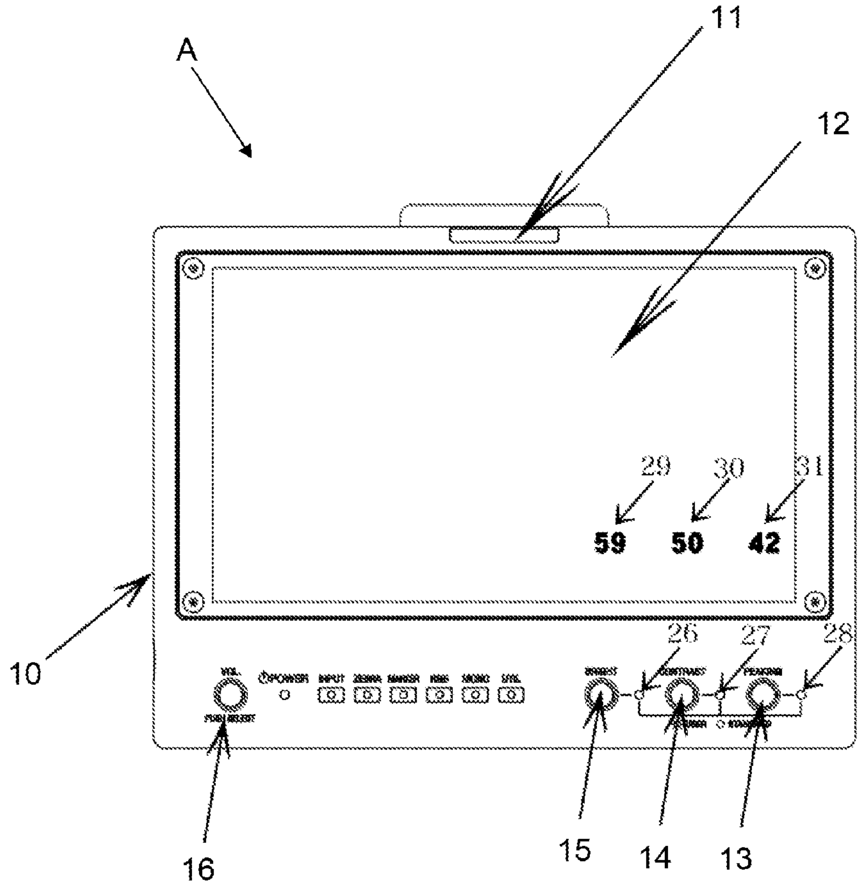
FIG. 2 is a front view illustrating the video camera monitor according to the one embodiment of the present invention.

As shown in FIG. 2, the video camera monitor apparatus A includes, on a front side thereof, a box-shaped main body unit 10, a liquid crystal display unit 12, a tally display unit 11, a brightness adjustor 15, a contrast adjustor 14, a peaking adjustor 13, and an audio volume adjustor 16.

The main body unit 10 receives therein each of the function blocks in FIG. 1. The liquid crystal display unit 12 displays a video selected by a video selector 5, under control of a display controller 6, in a condition of the peaking level, the brightness level, and the contrast level, which are adjusted by the video display adjustor 8. The tally display unit 11 emits light under control of the tally display controller 44.

The brightness adjustor 15, the contrast adjustor 14, and the peaking adjustor 13 are collectively named as video display adjustors, and the adjustors are used for respectively adjusting the brightness level, the contrast level, and the peaking level (hereinafter, referred to as "video display levels"). When volume knobs of the above adjustors are rotated, each of the video display levels is displayed in the liquid crystal display unit 12 for several seconds as indicated by numerals 29, 30, 31. The condition of the above level display may be arbitrarily set in a user mode. Also, an LED 26, an LED 27, and an LED 28 are turned off by pushing the volume knobs of the adjustors, and then the operation of the adjustors are changed to the preset mode (fixed standard setting level). The video display adjustor 8 adjusts the video display levels based on the input from the video display adjustors. Because the video display levels are adjusted based on the above method in the video camera monitor apparatus A of the present embodiment, the video display levels are accurately adjustable and the video is monitored regardless of manufacturers or types of the video camera. Also, it becomes possible to effectively display the video regardless of the difference of the video camera prepared on site. The audio volume adjustor 16 adjusts the volume of the audio outputted from the audio output unit 42.

3. Backside Appearance of Video Camera Monitor Apparatus A and Arrangement of Connectors and Display Unit Next, the backside appearance of the video camera monitor apparatus A and the arrangement of the connectors and the display unit are described.

Figure 3:
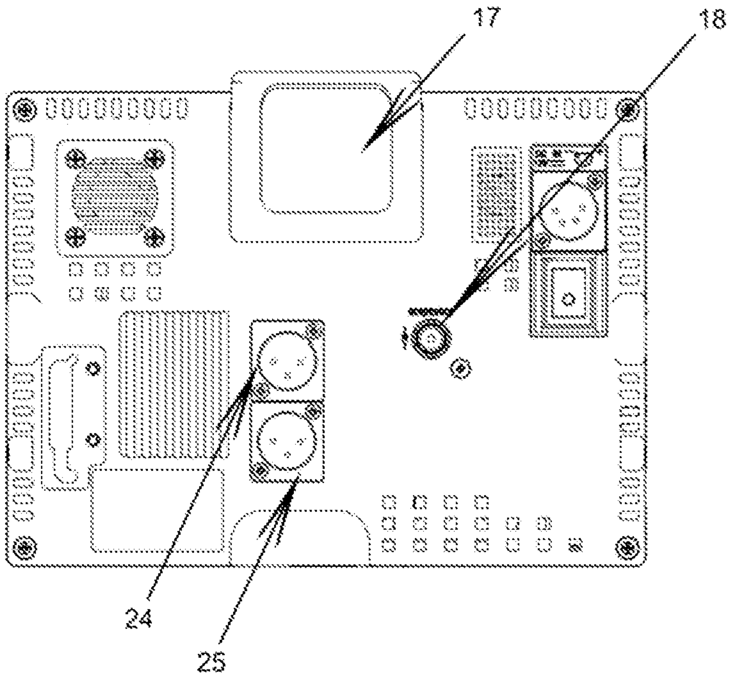
FIG. 3 is a backside view illustrating the video camera monitor according to the one embodiment of the present invention.

As shown in FIG. 3, the video camera monitor apparatus A includes, on a back side thereof, a tally display unit 17, a camera video input connector 18, an audio output terminal 24, and an audio output terminal 25.

The tally display unit 17 emits light under control of the tally display controller 44. The camera video input connector 18 receives the camera video signals from the video camera. The camera video signals are inputted into the camera video input unit 4 through the connector.

A VIDEO CAMERA MONITOR APPARATUS
4 CAMERA VIDEO INPUT UNIT
6 DISPLAY CONTROLLER
7 STORAGE UNIT
8 VIDEO DISPLAY ADJUSTOR
9 AUDIO SIGNAL SEPARATOR
10 MAIN BODY UNIT
11 TALLY DISPLAY UNIT
12 LIQUID CRYSTAL DISPLAY UNIT
13 PEAKING ADJUSTOR
14 CONTRAST ADJUSTOR
15 BRIGHTNESS ADJUSTOR
16 AUDIO OUTPUT VOLUME ADJUSTOR
17 REAR-SIDE TALLY DISPLAY UNIT
18 CAMERA VIDEO SIGNAL INPUT CONNECTOR
24, 25 AUDIO OUTPUT CONNECTOR
26, 27, 28 LED

29 BRIGHTNESS LEVEL DISPLAY
30 CONTRAST LEVEL DISPLAY
31 PEAKING LEVEL DISPLAY
41 DA CONVERTOR
42 AUDIO OUTPUT UNIT
42 ANALOG AUDIO OUTPUT UNIT
44 TALLY DISPLAY CONTROLLER

The invention claimed is:

1. A video camera monitor comprising:

a camera video input unit that receives a camera video signal including a REC RUN time code; and a tally display controller that controls tally display, wherein the camera video signal does not include a tally signal, and the tally display controller controls the tally display based on whether the REC RUN time code is being advanced.

2. The video camera monitor according to claim 1, wherein the camera video signal is an SDI signal.

3. The video camera monitor according to claim 1, further comprising:

a video display adjustor that adjusts a peaking level, a brightness level, and a contrast level;

a storage unit that stores an operational state adjusted by the video display adjustor; and a video display setting switcher that switches an operation between the state stored in the storage unit and an initial state.

4. The video camera monitor according to claim 1, wherein:

the camera video signal includes an embedded audio digital signal; and the video camera monitor further comprising:

an audio signal separator that separates the embedded audio digital signal from the camera video signal;

a DA converter that converts the digital signal separated by the separator into an analog signal; and an analog audio output unit that outputs the converted analog signal.

* * * * *